(12) United States Patent
Rangarajan et al.

(10) Patent No.: US 9,684,457 B2
(45) Date of Patent: Jun. 20, 2017

(54) GATHERING SENSED DATA FROM DEVICES TO MANAGE HOST COMMAND TRANSMISSION AND COOLING OF THE DEVICES

(71) Applicant: INTEL CORPORATION, Santa Clara, CA (US)

(72) Inventors: Thanunathan Rangarajan, Bangalore (IN); Eng Hun Ooi, Georgetown (MY); Madhusudhan Rangarajan, Round Rock, TX (US); Robert W. Cone, Portland, OR (US); Nishi Ahuja, University Place, WA (US)

(73) Assignee: INTEL CORPORATION, Santa Clara, CA (US)

( * ) Notice: Subject to any disclaimer, the term of this patent is extended or adjusted under 35 U.S.C. 154(b) by 14 days.

(21) Appl. No.: 14/719,234

(22) Filed: May 21, 2015

(65) Prior Publication Data
US 2016/0342328 A1 Nov. 24, 2016

(51) Int. Cl.
G06F 3/00 (2006.01)
G06F 13/00 (2006.01)
G06F 3/06 (2006.01)
G06F 1/20 (2006.01)

(52) U.S. Cl.
CPC .............. *G06F 3/061* (2013.01); *G06F 1/206* (2013.01); *G06F 3/067* (2013.01); *G06F 3/0653* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 6,735,642 B2 * | 5/2004 | Kagan | ..................... | G06F 13/28 710/22 |
| 8,090,902 B1 * | 1/2012 | Bennett | ................ | G11B 5/5565 711/111 |
| 8,281,043 B2 | 10/2012 | Edwards et al. | | |

(Continued)

OTHER PUBLICATIONS

Intel Corporation, "Intel C600 Series Chipset", [online], [Retrieved on Mar. 11, 2015], retrieved from the Internet at <URL: http://www-ssl.intel.com/content/www/us/en/chipsets/server-chipsets/se . . . >, 3 pp.

(Continued)

*Primary Examiner* — David E Martinez
(74) *Attorney, Agent, or Firm* — Konrad Raynes Davda & Victor LLP; David W. Victor (57) ABSTRACT

Provided are a computer readable storage media, method, and system for gathering sensed data from devices to manage host command transmission and cooling of the device. Host commands are retrieved from a host memory in a host to perform Input/Output operations with respect to a device. The retrieved host commands are transmitted to the device to perform the I/O operations of the host command. A monitor command is transmitted to obtain sensed data from the device while processing the host commands. A rate of transmitting the host commands is adjusted in response to determining that the sensed data received from the device in response to the monitor command satisfies a condition.

22 Claims, 6 Drawing Sheets

(56) References Cited

U.S. PATENT DOCUMENTS

| | | | |
|---|---|---|---|
| 8,954,614 B1* | 2/2015 | Beeson | G06F 3/061 710/18 |
| 2003/0191889 A1 | 10/2003 | Forrer, Jr. | |
| 2005/0216221 A1 | 9/2005 | Broyles, III et al. | |
| 2008/0046766 A1* | 2/2008 | Chieu | G06F 1/206 713/300 |
| 2008/0228959 A1* | 9/2008 | Wang | G06F 1/206 710/22 |
| 2009/0125741 A1* | 5/2009 | Burton | G06F 1/206 713/323 |
| 2009/0204853 A1 | 8/2009 | Diggs et al. | |
| 2014/0005854 A1 | 1/2014 | Lim et al. | |
| 2015/0046664 A1 | 2/2015 | Fitzpatrick et al. | |
| 2015/0261281 A1* | 9/2015 | Bickelman | G06F 1/206 713/322 |

OTHER PUBLICATIONS

Intel Corporation, "Intel C600 Series Chipset and Intel X79 Express Chipset", Datasheet, Apr. 2013, 956 pp.

Intel Corporation, "Serial ATA Advanced Host Controller Interface (AHCI)", Revision 1.0, Specification, [online], [Retrieved on Feb. 24, 2015], retrieved from the Internet at <URL: http://www.intel.com/content/www/us/en/io/serial-ata/ahci.html>, 83 pp.

Intel Corporation, "Serial ATA Advanced Host Controller Interface (AHCI)", Revision 1.3, Specification, [online], [Retrieved on Mar. 11, 2015], retrieved from the Internet at <URL: http://www.intel.com/content/www/us/en/io/serial-ata/ahci.html>, 131 pp.

Wikipedia, "Advanced Host Controller Interface", [online], last modified Mar. 3, 2015, [retrieved on Apr. 14, 2015], retrieved from the Internet at <URL: http://en.wikipedia.org/wiki/Advanced_Host_Controller_Interface>, 3 pp.

Wikipedia, "Intelligent Platform Management Interface", [online], last modified Dec. 31, 2014, [retrieved on Feb. 23, 2105], retrieved from the Internet at <URL: http://en.wikipedia.org/w/index.php?title=Intelligent_Platform_Management_Interface&oldid=640430036>, 6 pp.

Wikipedia, "S.M.A.R.T.", [online], last modified Feb. 15, 2015, [retrieved on Feb. 25, 2015], retrieved from the Internet at <URL: http://en.wikipedia.org/w/index.php?title=S.M.A.R.T.&oldid=647298921>, 18 pp.

Wikipedia, "Serial ATA", [online], last modified Mar. 30, 2015, [retrieved on Apr. 14, 2015], retrieved from the Internet at <URL: http://en.wikipedia.org/wiki/Serial_ATA>, 24 pp.

International Search Report and Written Opinion for International Application No. PCT/US2016/028707, dated Jul. 26, 2016, 16 pp.

* cited by examiner

GATHERING SENSED DATA FROM DEVICES TO MANAGE HOST COMMAND TRANSMISSION AND COOLING OF THE DEVICES

TECHNICAL FIELD

Embodiments described herein generally relate to managing host command transmission and cooling of storage devices.

BACKGROUND

Storage devices (e.g., hard disk drives, solid state storage drives) are highly susceptible to failure. Factors such as prolonged exposure to high temperatures, mechanical failures and perturbations, and aging can all contribute to failures in the field. Customers managing large data centers having thousands of storage devices experience high ambient temperatures due to the conglomeration of devices in one space. Higher ambient temperatures in a computing environment introduce stress to disk operations, especially during peak load times. This added stress due to higher temperatures impacts the disk operations.

Many hard disk drive and solid state drive vendors provide the capability to monitor the disk's current temperature, as well as other important data such as occurrence of failure, etc. Such data is provided through a telemetry mechanism known as SMART (Self-Monitoring Analysis and Reporting Technology). SMART data gathered in the disk drive can be accessed by operating systems device drivers issuing SMART commands to the disk drives.

Systems also include a baseboard management controller (BMC), which is typically implemented as a chip on the motherboard. that monitors the temperature in the enclosure resulting from central processing unit (CPU) operations. The BMC may control the operation of fans to reduce the temperature, especially for the CPU. The BMC operates independently of the disk drives and the information they gather, including temperature and other attributes of operations.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Current thermal management technologies allow a host operating system device driver to obtain temperature and other operational information from the storage devices. Separate from this process, a baseboard management controller in the host enclosure, such as on the host motherboard, may independently measure temperature and control a cooling unit to cool devices in the computer system. However, current systems do not provide an integrated approach for thermal management of numerous storage devices connected to a controller. Thus, there is a need in the art for improved techniques for providing an integrated approach to managing the ambient temperature produced by system components, such as storage devices.

Certain described embodiments provide techniques for a storage device controller to manage the temperature at multiple attached storage devices external to the host system. The controller may adjust a rate at which retrieved host commands for Input/Output operations with respect to the storage devices are transmitted to the attached storage devices based on the temperature and other sensed data obtained from the storage devices. Further, the controller may control cooling units to separately cool the storage devices based on the temperature information gathered from the storage devices.

Described embodiments provide an out-of-band, autonomous thermal management system executed by a disk controller, which may be embedded in a Platform Controller Hub (PCH), that leverages disk monitoring technology such as the SMART protocol supported by the disk device. The described thermal management system may integrate with a platform management entity, such as the BMC or management engine, to adaptively operate the disk device to intelligently reduce workload or boost cooling units, such as fans, during stressful conditions such as temperature excursions.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

Figure 1:
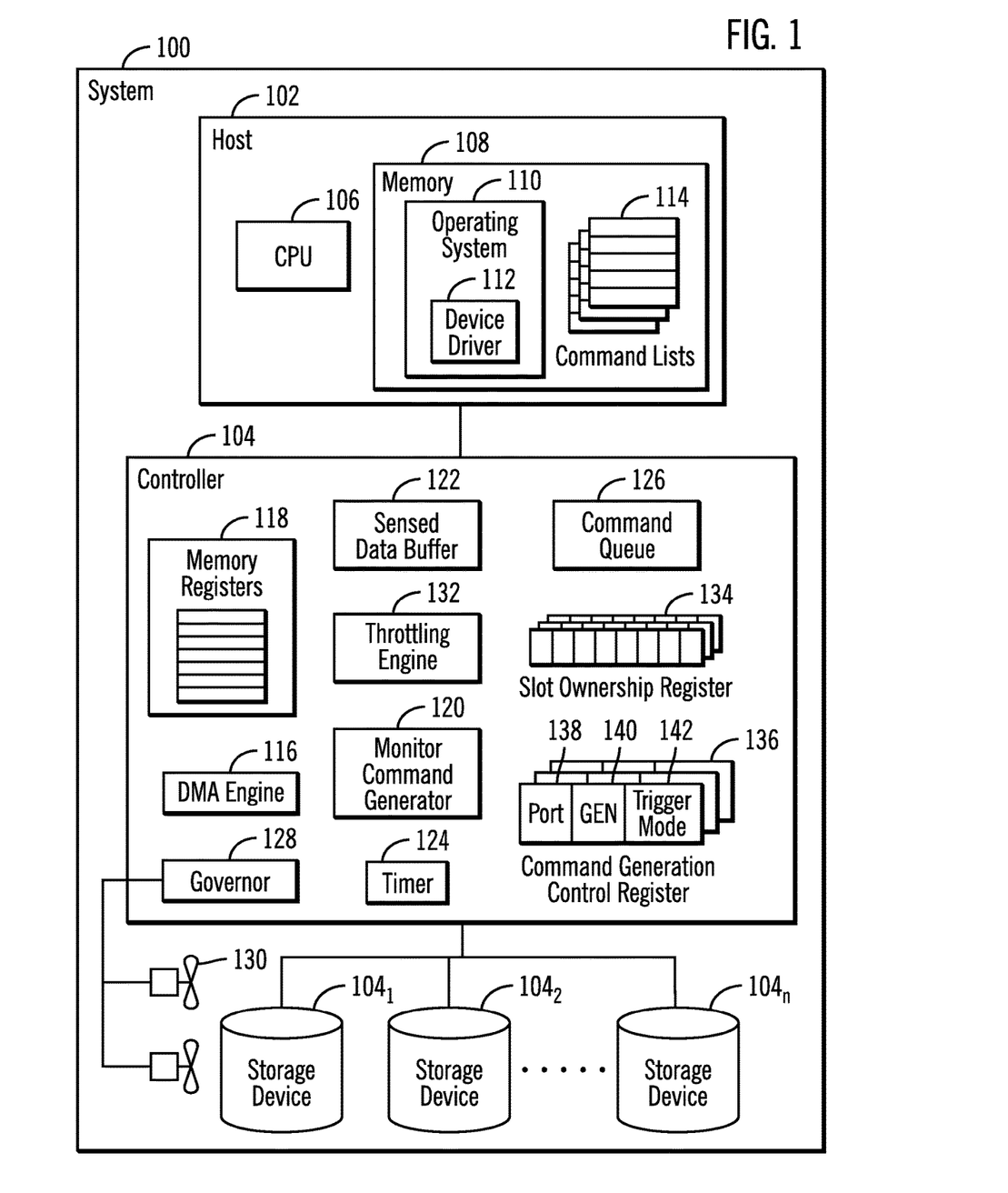
FIG. 1 illustrates an embodiment of a computing system.

FIG. 1 illustrates an embodiment of a system 100 having a host 102 and a controller 104 managing access to one or more storage devices $104_1$, $104_2$ . . . $104_n$. The host 102 includes a central processing unit (CPU) 106, which may comprise one or more processors each having one or more cores, and a host memory 108 including an operating system 110, a device driver 112 to interface with the controller 102 and storage devices $104_1$, $104_2$ . . . $104_n$, and one or more command lists 114. A command list 114 comprises one or more command slots each having a host command added by the device driver 112 to perform an Input/Output (I/O)

operation with respect to the storage devices $104_1$, $104_2 \ldots 104_n$. The controller 104 includes one or more Direct Memory Access (DMA) engines 116 to retrieve commands from the command lists 114 to transmit to the storage device $104_1, 104_2 \ldots 104_n$ to which the host command is directed. In one embodiment, there may be one DMA engine to process each command list 114, or one DMA engine may process host commands from multiple command lists 114.

The system 100 may include additional components, such as an antenna, keyboard, monitor, multi-media controller, wireless receiver, etc.

The controller 104 includes memory registers 118 that include pointers to the command lists 114 in the host memory 102 and are used by the DMA engine 116 to access the command slots in the command lists 114. In one embodiment, the controller 104 may retrieve host commands from the host memory 108 according to the Advanced Host Controller Interface (AHCI) protocol. The AHCI is a technical standard defined by Intel Corporation that specifies the operation of Serial Advanced Technology Attachment (SATA) host bust adaptors. The controller 104 further includes a sensed data buffer 122 in which sensed data gathered from the storage devices $104_1, 104_2 \ldots 104_n$ may be stored without returning to the host 102. The sensed data may comprise temperature or other monitored attributes determined by sensors in the storage devices $104_1$, $104_2 \ldots 104_n$, such as temperature, inability to read certain sectors, errors, drive wear, device health data, other failure prediction attributes, etc. In certain embodiments, the sensed data may comprise attributes determined from the storage devices $104_1, 104_2 \ldots 104_n$ implementing SMART. (Self-Monitoring, Analysis and Reporting Technology) technology In SMART embodiments, the monitor command generated to retrieve sensed data gathered at the storage devices $104_1, 104_2 \ldots 104_n$ may comprise a SMART command. The monitor command to retrieve sensed data may be referred to with a different name or operation code and comprise a single command or multiple commands to implement the command described as a "monitor command".

A monitor command generator 120 periodically generates monitor commands on each port, where there is one port for each connected storage device $104_1, 104_2 \ldots 104_n$, to retrieve sensed data, such as temperature or health data from the storage devices $104_1, 104_2 \ldots 104_n$. The monitor command generator 120 emulates an operating system driver 112 that generates the monitor commands, e.g., SMART commands. The sensed data returned in response to the monitor commands may be stored in a sensed data buffer 122 in the controller 104 without being transferred to the host 102. The monitor command generator 120 may generate the monitor commands periodically upon expiration of a timer 124. Alternatively, a governor engine 128 may control the monitor command generator 120 to generate monitor commands to access sensed data from the storage devices $104_1, 104_2 \ldots 104_n$.

The governor engine 128 may perform thermal management of the storage devices $104_1, 104_2 \ldots 104_n$, such as by controlling external platform entities such as cooling units 130, which may comprise fans, liquid cooling devices, thermal materials, etc. In one embodiment, there may be different cooling units for different groups of storage devices $104_1, 104_2 \ldots 104_n$, so that the governor 128 may independently control the cooling units 130 for different groups of storage devices $104_1, 104_2 \ldots 104_n$ as needed.

The governor engine 128 may also setup and configure management policies of a throttling engine 124 that based on the sensed data in the buffer 122 determines how to throttle or slow the processing of commands retrieved from the command lists 114 in the host memory 102. The governor 128 may also use the sensed data in the buffer 122 to execute an online prediction algorithm to determine possible failures, such as due to thermal stress.

The throttling engine 132 includes logic to determine if the sensed data from the storage devices $104_1, 104_2 \ldots 104_n$ exceeds a threshold, such as a temperature threshold, and then causes a throttling of the retrieved host commands from the command lists 114, such as reducing a rate at which the retrieved host commands are processed. In one embodiment, a command queue 126 may be used to queue retrieved host commands to delay the transmission of the host commands to the storage devices $104_1, 104_2 \ldots 104_n$, where host or monitor commands are buffered until they are ready to be transmitted.

The monitor command generator 120 maintains slot ownership registers 134, where there may be one register 134 for each of the command lists 114, where each of the entries or bits in the register 134 corresponds to one command slot in the command list 114 for which the register 134 is provided. The monitor command generator 120, or some other component, would set a bit in an entry in the slot ownership register 134 corresponding to the command slot in the command list 114 in which the monitor command will be placed. Setting the bit in the slot ownership register 134 to indicate that the command slot in the command list 114 is owned will cause the host device driver 112 to view that command slot as owned and ignore and not use that command slot. This allows the controller 104 to inject the monitor command in one of the command slots of the command lists 114 to cause the inclusion of the monitor command in the flow of host commands in other of the command slots. In this way, the slot ownership register 134 comprises an internal semaphore indicating that the corresponding command slot in a command list 114 is not available to the host 102, also known as command slot masquerading.

The DMA engine 116 processes and transmits the monitor commands when processing the slot used for the monitor command. Because the host device driver 112 ignores the command slot used for the monitor command indicated as owned in the slot ownership register 134, injecting the monitor command into the command lists 114 does not disrupt host device driver 112 operations. Further, the host device driver 112 will not use those command slots indicated in the slot ownership register 134 as owned.

The monitor command generator 120 may further maintain a command generation control register 136 for each port/storage device $104_1, 104_2 \ldots 104_n$ that provides information on how monitor commands are generated. Each command generation control register 136 indicates a port field 138 of a port or device for which the information is provided; a GEN field that instructs the monitor command generator 120 to include a monitor command in the command slot the command list 114 selected for use with the monitor command; and a trigger mode 142 indicating the method used to fill the monitor command slot in the command list 114. An "AUTO" mode for the trigger mode 142 indicates that the monitor command is added to the command slot in the command list 114 when the timer 124 expires. An "ONDEMAND" mode for the trigger mode 142 indicates that the monitor command is added to a command slot in the command list 114 in response to being requested to do so by the governor 125 or other component.

In one embodiment, the controller 104 may comprise a storage device controller, such as a Serial ATA (SATA)

controller or other controller devices known in the art. The controller 104 may be implemented in a chipset external from the host 102 components, such as a Platform Controller Hub (PCH) or other chipset on the motherboard. Further the controller 104 components may be implemented in a single chipset or multiple chipsets on the system 100 motherboard. In alternative embodiments, certain of the components, such as the monitor command generator 120, throttling engine 132, governor 128, and others may be implemented in a chip set external to the storage device controller 104.

The host memory 102 may comprise a suitable volatile or non-volatile memory device The storage devices system $104_1$, $104_2$ . . . $104_n$ may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), three dimensional cross-point memory, conductive bridging RAM (CBRAM), magnetic hard disk drive, optical disk, tape, etc. The storage devices $104_1$, $104_2$ . . . $104_n$ may be configured in an array, such as a Just a Bunch of Disks (JBOD) or Redundant Array of Independent Disk (RAID) arrays.

In certain embodiments, the devices $104_1$, $104_2$ . . . $104_n$ being accessed through the controller 102 comprise storage devices. In alternative embodiments, the devices $104_1$, $104_2$ . . . $104_n$ may comprise Input/Output devices other than a storage device.

Figure 2:
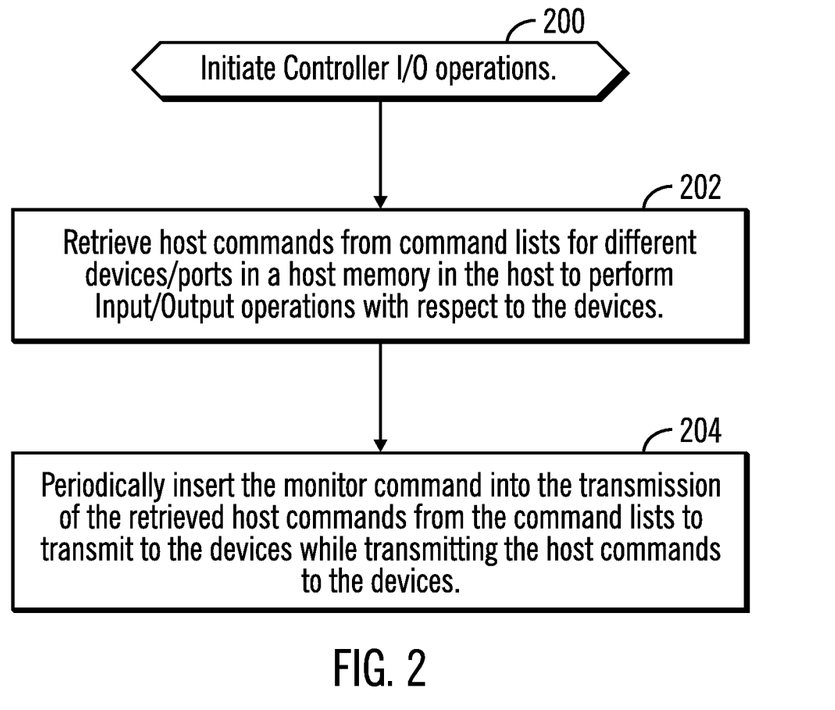
FIG. 2 illustrates an embodiment of a controller processing Input/Output (I/O) operations from a host in the computing system.

FIG. 2 illustrates an embodiment of operations performed by the Direct Memory Access (DMA) engine 116 or other controller component 104 to inject monitor commands in a stream of host commands being retrieved from the command lists 114 in the host memory 102 being forwarded to the storage devices $104_1$, $104_2$ . . . $104_n$. Upon initiating (at block 200) controller Input/Output (I/O) operations, the DMA engine 116 uses the memory registers 118 to access command slots of command lists 114 in the host memory 108 to retrieve (at block 202) host commands added to the command slots. The DMA engine 116 or monitor command generator 120 may periodically insert (at block 204) the monitor commands into the transmission of the retrieved host commands from the command lists 114 to transmit to the storage devices $104_1$, $104_2$ . . . $104_n$ while transmitting the host commands to the devices storage devices $104_1$, $104_2$ . . . $104_n$. In certain embodiments, monitor commands may be injected according to the logic of FIG. 3. In other embodiments, other operations and techniques may be used to inject monitor commands into the flow of host commands being retrieved by the DMA engine 116 and transmitted to the storage devices $104_1$, $104_2$ . . . $104_n$ using a storage bus protocol, e.g., SATA, Serial Attached SCSI (SAS), Versa Module Europa bus (VMEbus), etc.

Figure 3:
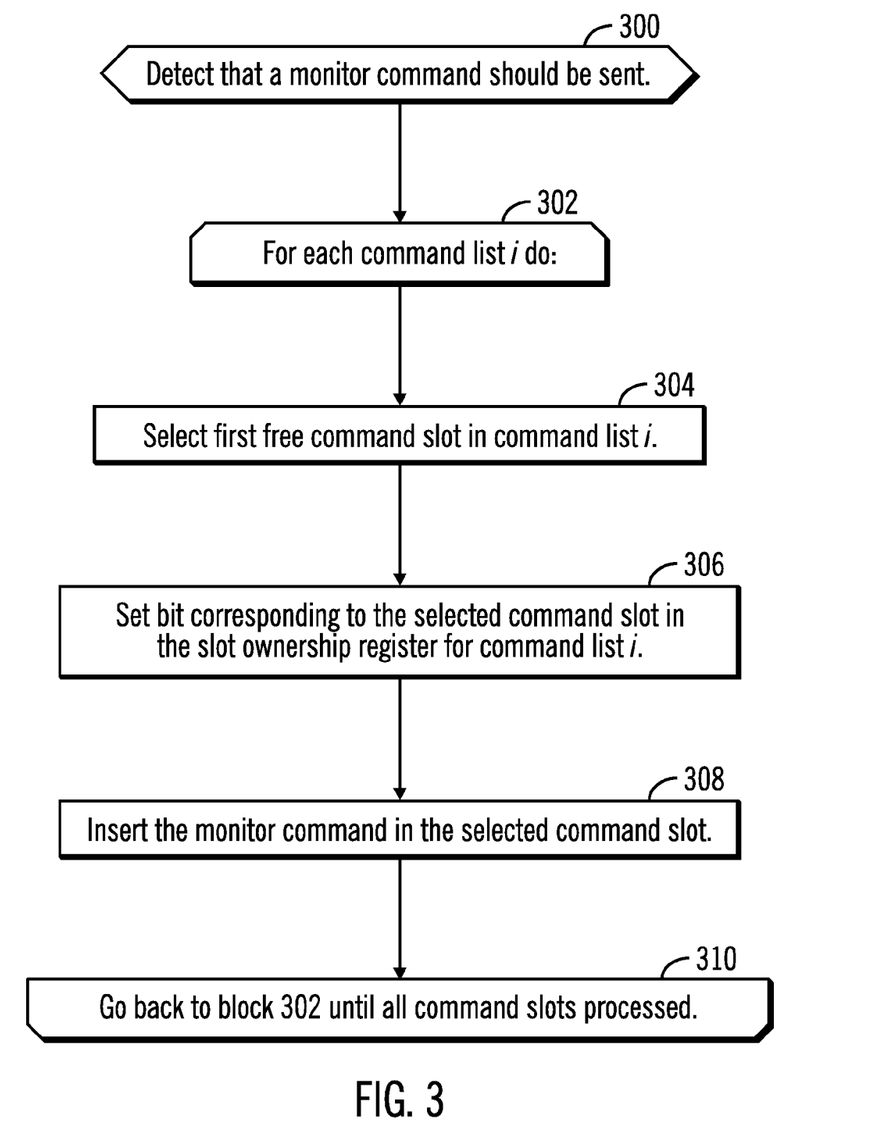
FIG. 3 illustrates an embodiment of controller operations to select a command slot in a command list in the host memory to use for a monitor command.

FIG. 3 illustrates an embodiment of operations performed by the monitor command generator 120 or some other controller 104 component to inject the monitor commands into the command lists 114 so the DMA engine 116 will process the monitor commands when processing command slots in the command lists 114, thereby injecting monitor commands into the flow of host commands being processed. The monitor command generator 120 detects (at block 300) that a monitor command should be sent. The monitor command generator 120 may be triggered to generate the monitor commands in response to the timer 124 periodically expiring. Alternatively, the governor 128 may determine when to send the monitor commands and set a bit in a register, such as the GEN bit 140 in the command generation control register 136, to cause the monitor command generator 120 to add the monitor command to command slots in the command lists 114. Upon detecting (at block 300) to send the monitor commands, the monitor command generator 120 performs a loop of operations at blocks 302 through 310 for each of the command lists 114, where there may be one command list 114 for each storage device $104_1$, $104_2$ . . . $104_n$ or port connecting the controller 104 to each of the storage devices $104_1$, $104_2$ . . . $104_n$. For command list i, the monitor command generator 120 selects (at block 304) a first free command slot in command list i that does not have a host command. A bit corresponding to the selected command slot in the slot ownership register 134 is set (at block 306) to indicate that the selected command slot is owned, or unavailable to the host device driver 112. The monitor command generator 120 inserts (at block 308) the monitor command into the selected command slot. The monitor command generator 120 may use the DMA engine 116 for the command list i to insert the monitor command 120 or a pointer to a monitor command for the DMA engine 116 to use. In one embodiment, the actual monitor, e.g., SMART, command may be inserted into the command slot in the command list 114. Alternatively, a pointer or other identifier of the monitor command may be included in the selected command slot.

In the embodiment of FIG. 3, the monitor commands are injected into the stream of commands sent to the storage devices $104_1$, $104_2$ . . . $104_n$ by inserting the monitor commands into the command lists 114. In alternative embodiments, the monitor commands may be inserted into the stream of host commands within the controller 104, such as by the controller 104 directly injecting the monitor commands without inserting them into the command slots in the host memory 108.

Figure 4:
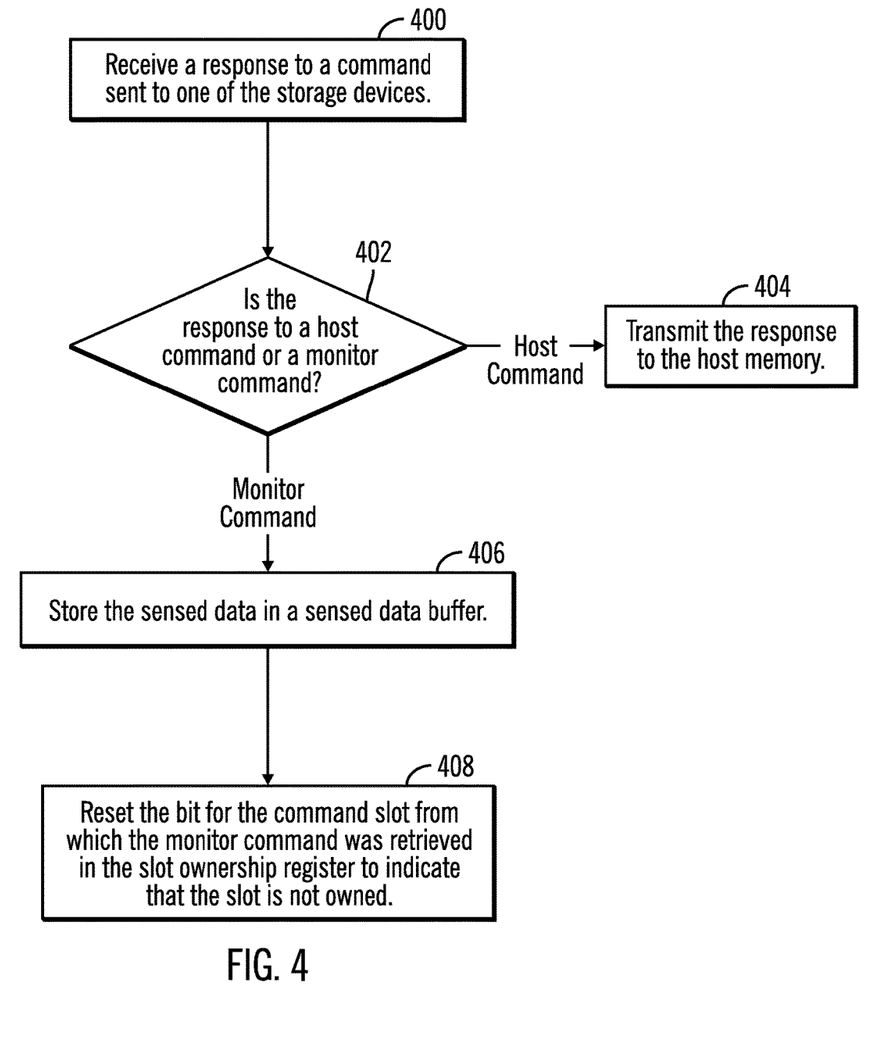
FIG. 4 illustrates an embodiment of controller operations to process a response to a command sent to the storage device.

FIG. 4 illustrates an embodiment of operations performed by the DMA engine 116 or some other controller 104 component to process responses to host and monitor commands received from the storage devices $104_1$, $104_2$ . . . $104_n$. Upon receiving (at block 400) a response to a host or monitor command, a determination is made whether the response is to a host or monitor command. This determination may be made by determining whether the slot ownership register 134 bit corresponding to the command slot from which the host or monitor command was retrieved is set to indicate that command slot is owned. If the command slot is owned, then the response comprises sensed data for a monitor command, and if not indicated as owned, the response is for a host I/O request. The determination of host or monitor command may also be determined by inspecting the content of the response.

If (at block 402) the response is for a host command, then the DMA engine 116 transmits (at block 404) the response to the originating command slot in the command list 114 for the port/storage device sending the response in the host memory 108. Otherwise, if the response is for a monitor command, the received sensed data, e.g., temperature data, is stored (at block 406) in the sensed data buffer 122. At this time, the bit in the slot ownership register 134 for the command slot from which the monitor command was retrieved may be set (at block 408) to indicate that command slot is no longer owned and available to the host 102. With the operations of FIG. 4, the sensed data is not returned to the host 102, but maintained in the controller 104.

Figure 5:
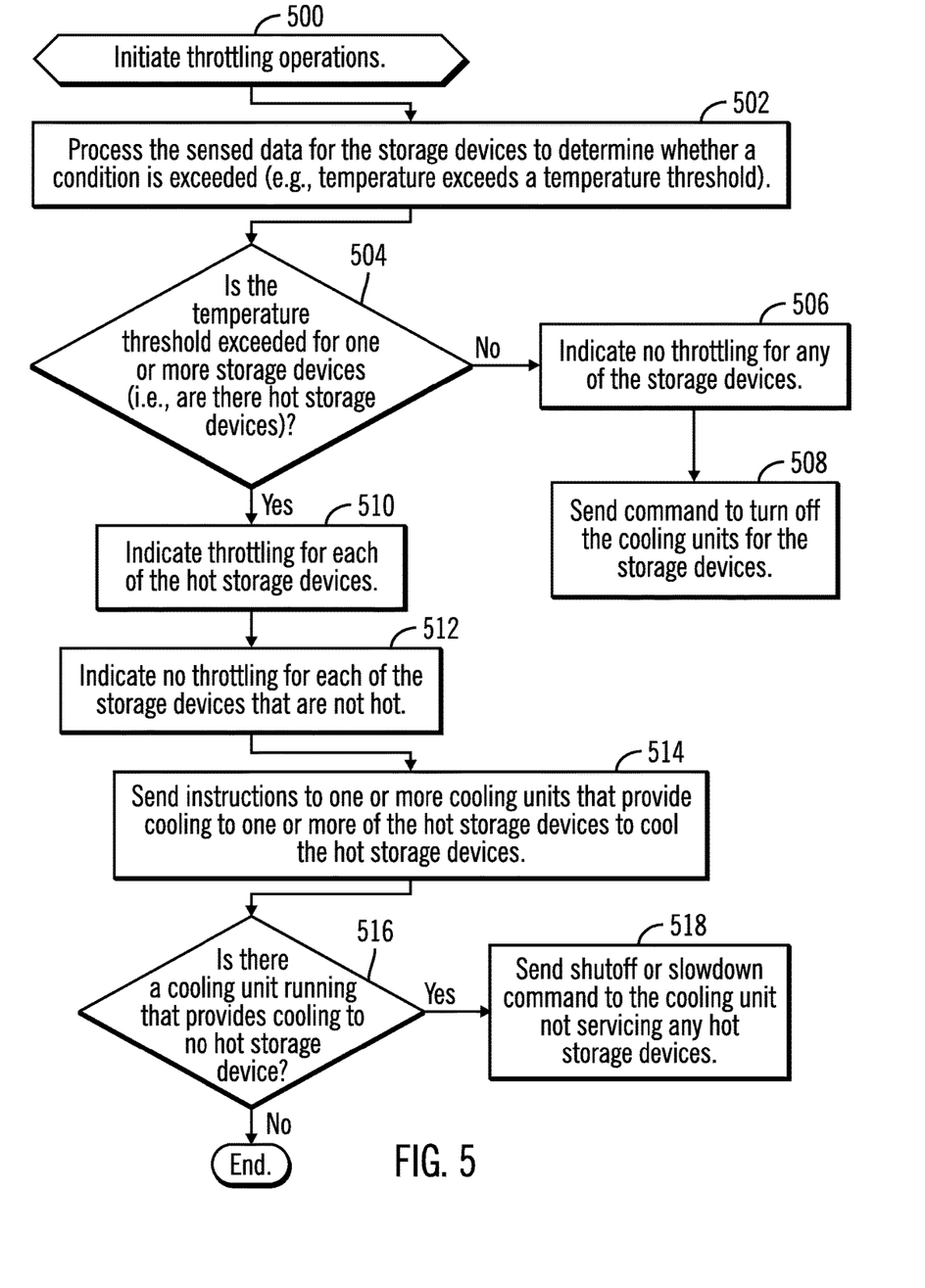
FIG. 5 illustrates an embodiment of controller operations to perform throttling of commands retrieved from the host memory and to operate a cooling unit.

FIG. 5 illustrates an embodiment of operations performed by components of the controller 104, such as the throttling engine 132 and governor 128, to perform thermal management operations of the storage devices $104_1, 104_2 \ldots 104_n$. Upon initiating (at block 500) throttling operations, the throttling engine 132 processes (at block 502) the sensed data in the sensed data buffer 122 for the storage devices $104_1, 104_2 \ldots 104_n$ to determine whether a condition is exceeded (e.g., the temperature of each of the storage devices exceeds a temperature threshold). If (at block 504) the temperature threshold is not exceeded by any of the storage devices $104_1, 104_2 \ldots 104_n$, then the throttling engine 132 indicates (at block 506) that there is no throttling for any of the storage devices $104_1, 104_2 \ldots 104_n$, which means that retrieved host and monitor commands from the command lists 114 are processed without being buffered in the command queue 126. The governor 128 may send (at block 508) commands to turn off the cooling units 130 for the storage devices $104_1, 104_2 \ldots 104_n$.

If (at block 504) there are one or more storage devices $104_1, 104_2 \ldots 104_n$ having a measured temperature exceeding the temperature threshold, i.e., are hot storage devices, then the throttling engine 132 indicates (at block 510) to perform throttling of the commands for each of the hot storage devices. During throttling, host and monitor commands to hot storage devices are buffered in the command queue 126 within a command throttling time window. The queued commands are processed outside of the throttling time window. Further, no throttling is indicated for each of the storage devices whose temperature does not exceed the threshold, i.e., are not hot. The governor 128 may further send (at block 514) instructions to one or more of the cooling units 130 that provide cooling to one or more of the hot storage devices to provide cooling services to the hot storage devices, e.g., air cooling, liquid cooling, etc. If (at block 516) there are cooling units 130 that do not service hot storage devices, then a command may be sent (at block 518) to such cooling units 130 to shut down or reduce cooling operations for those storage devices that are not hot. Otherwise, if (at block 516) all operating cooling units 130 are servicing only hot storage devices, then control ends.

With the described operations of FIG. 5, throttling is performed on a per storage device basis. In an alternative embodiment, throttling may be performed on a plurality of storage devices grouped together if any of the storage devices in the group are deemed hot storage devices. Alternative techniques may be performed to select the storage devices $104_1, 104_2 \ldots 104_n$ subject to throttling and cooling.

Figure 6:
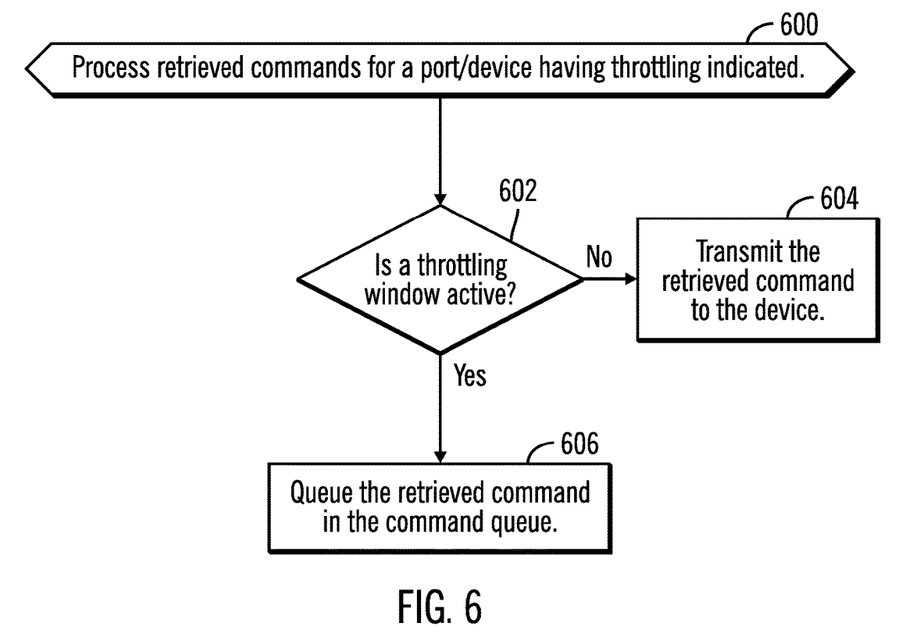
FIG. 6 illustrates an embodiment of controller operations to throttle commands retrieved from the host memory.

FIG. 6 illustrates an embodiment of the operations performed by the DMA engine 116 to process host or monitor commands for a port/device retrieved from the command lists 114 for which throttling is indicated. If (at block 602) the throttling window is not active, then the retrieved host or monitor commands are transmitted (at block 604) to their target storage devices $104_1, 104_2 \ldots 104_n$. Otherwise, if (at block 602) the throttling time window is active, then the retrieved commands are queued (at block 606) in the command queue 126. A throttling window may comprise a period of time or time window during which retrieved commands are queued. When the throttling time window becomes inactive after a period of time has elapsed, any pending host and monitor commands in the command queue 126 are transmitted to the storage devices.

Described embodiments provide a controller 104 that may be on a chipset separate from the host 102 components to handle command processing for multiple of the storage devices $104_1, 104_2 \ldots 104_n$ and to gather sensed data, such as temperature data, for the storage devices $104_1, 104_2 \ldots 104_n$. The gathered sense data may be processed to determine whether to throttle command processing of commands retrieved from the command lists 114 and/or to increase cooling to the storage devices $104_1, 104_2 \ldots 104_n$ to counter thermal excesses.

The described operations of the host 102, controller 104 and the logic components 110, 112, 116, 120, 128, 132, 110, 114, 116, 118, and other components, may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is a controller in communication with a host and a device, wherein the device includes at least one sensor to gather sensed data from the device, comprising: retrieving host commands from a host memory in the host to perform Input/Output operations with respect to the device; transmitting the retrieved host commands to the device to perform the I/O operations of the host command; transmitting a monitor command to obtain the sensed data from the device while processing the host commands; and adjusting a rate of transmitting the host commands in response to determining that the sensed data received from the device in response to the monitor command satisfies a condition.

In Example 2, the subject matter of Examples 1 and 3-13 can optionally include that the sensed data comprises a temperature of the device, and wherein the sensed data satisfies the condition when the temperature exceeds a threshold temperature, and wherein the adjusting the rate comprises slowing the rate at which the retrieved host commands are transmitted to the device.

In Example 3, the subject matter of Examples 1, 2 and 4-13 can optionally include that the slowing the rate at which retrieved host commands are transmitted comprises: transmitting the host commands to the device that are retrieved outside of a time window; queuing commands that are retrieved within the time window; and transmitting the queued commands during when the time window ends.

In Example 4, the subject matter of Examples 1-3 and 5-13 can optionally include that the operations further comprise: periodically inserting the monitor command into the transmission of the retrieved host commands to transmit to the device while transmitting the host commands to the device.

In Example 5, the subject matter of Examples 1-4 and 6-13 can optionally include that the operations further comprise: receiving a response to the host commands from the device; transmitting the response to the host commands to the host memory; and storing the sensed data received in response to the monitor command in a buffer in the controller without returning to the host memory.

In Example 6, the subject matter of Examples 1-5 and 7-13 can optionally include that the operations further comprise: transmitting instructions to control a cooling unit to cool the device in response to determining that the sensed data satisfies the condition.

In Example 7, the subject matter of Examples 1-6 and 8-13 can optionally include that the host commands for the device are stored in command slots in a command list in the host memory, wherein the operations further comprise: in response to determining to send a monitor command to the device, selecting one of the command slots to use for the monitor command; and inserting the monitor command into the selected command slot, wherein the monitor command is retrieved when retrieving data for the selected command slot when processing the command list.

In Example 8, the subject matter of Examples 1-7 and 9-13 can optionally include that the operations further comprise: setting a bit in a slot ownership register having a bit for each command slot to indicate the selected command slot is owned, wherein while the selected command slot is indicated as owned the host will ignore the command slot corresponding to the set bit.

In Example 9, the subject matter of Examples 1-8 and 10-13 can optionally include that the operations further comprise: receiving a response to the host or monitor commands from the device; determining the command slot from which the host or monitor command was retrieved; determining whether the bit in the slot ownership register for the determined command slot indicates that the determined command slot is owned; returning the response to the command slot in the host memory in response to determining that the bit indicates that the determined command slot is not owned; and storing the returned sensed data in a controller buffer in response to determining that the command slot is owned.

In Example 10, the subject matter of Examples 1-9 and 11-13 can optionally include that the determining to send the monitor command comprises one of: determining that a timer has expired; and receiving a command from a controller component to send the monitor command.

In Example 11, the subject matter of Examples 1-10 and 12-13 can optionally include that there are a plurality of devices connected to the controller to receive Input/Output requests from the host, wherein the host memory includes host commands for the plurality of the devices that are retrieved and transmitted to the devices, and wherein the monitor command is transmitted to the devices while transmitting the retrieved host commands, wherein the adjusting the rate comprises: receiving sensed data from the devices in response to the monitor commands sent to the devices; determining a first group of at least one of the plurality of devices each having sensed data that satisfies the condition, wherein a second group of devices of the plurality of devices not in the first group each has sensed data that does not satisfy the condition; and adjusting the rate of processing of queued host commands for the devices in the first group, wherein the rate of processing of the queued host commands for the devices in the second group is not adjusted.

In Example 12, the subject matter of Examples 1-11 and 13 can optionally include that there are a plurality of devices connected to the controller to receive Input/Output requests from the host system, wherein host memory includes command lists, one for each of the devices, having the host commands for the devices, wherein the operations further comprise: periodically inserting the monitor command into the transmission of the retrieved host commands from the command lists to transmit to the devices while transmitting the host commands to the devices.

In Example 13, the subject matter of Examples 1-12 can optionally include that the operations further comprise: receiving responses to the host commands from the devices; transmitting the responses to the host commands to the host memory; and storing the sensed data for the devices received in response to the monitor commands in a buffer in the controller without returning to the host memory.

Example 14 is a computer readable storage medium including instructions to control a controller in communication with a host and a device, wherein the device includes at least one sensor to gather sensed data from the device, wherein the instructions when executed cause operations to be performed, the operations comprising: retrieving host commands from a host memory in the host to perform Input/Output operations with respect to the device; transmitting the retrieved host commands to the device to perform the I/O operations of the host command; transmitting a monitor command to obtain the sensed data from the device while processing the host commands; and adjusting a rate of transmitting the host commands in response to determining that the sensed data received from the device in response to the monitor command satisfies a condition.

In Example 15, the subject matter of Examples 16-19 can optionally include that the sensed data comprises a temperature of the device, and wherein the sensed data satisfies the condition when the temperature exceeds a threshold temperature, and wherein the adjusting the rate comprises slowing the rate at which the retrieved host commands are transmitted to the device.

In Example 16, the subject matter of Examples 15 and 17-19 can optionally include that the operations further comprise: periodically inserting the monitor command into the transmission of the retrieved host commands to transmit to the device while transmitting the host commands to the device.

In Example 17, the subject matter of Examples 15-17 and 18-19 can optionally include that the operations further comprise: receiving a response to the host commands from the device; transmitting the response to the host commands to the host memory; and storing the sensed data received in response to the monitor command in a buffer in the controller without returning to the host memory.

In Example 18, the subject matter of Examples 15-17 and 19 can optionally include that the operations further comprise: transmitting instructions to control a cooling unit to cool the device in response to determining that the sensed data satisfies the condition.

In Example 19, the subject matter of Examples 15-18 can optionally include that the host commands for the device are stored in command slots in a command list in the host memory, wherein the operations further comprise: in response to determining to send a monitor command to the device, selecting one of the command slots to use for the monitor command; and inserting the monitor command into the selected command slot, wherein the monitor command is retrieved when retrieving data for the selected command slot when processing the command list.

Example 20 is a method, comprising: retrieving host commands from a host memory in a host to perform Input/Output operations with respect to a device; transmitting the retrieved host commands to the device to perform the I/O operations of the host command; transmitting a monitor command to obtain sensed data from the device while processing the host commands; and adjusting a rate of transmitting the host commands in response to determining that the sensed data received from the device in response to the monitor command satisfies a condition.

In Example 21, the subject matter of Example 20 can optionally include at least one step of:

(1) wherein the sensed data comprises a temperature of the device, and wherein the sensed data satisfies the condition when the temperature exceeds a threshold temperature, and wherein the adjusting the rate comprises slowing the rate at which the retrieved host commands are transmitted to the device; and/or (2) wherein the slowing the rate at which retrieved host commands are transmitted comprises: transmitting the host commands to the device that are retrieved outside of a time window; queuing commands that are retrieved within the time window; and transmitting the queued commands during when the time window ends; and/or (3) periodically inserting the monitor command into the transmission of the retrieved host commands to transmit to the device while transmitting the host commands to the device; and/or (4) receiving a response to the host commands from the device; transmitting the response to the host commands to the host memory; and storing the sensed data received in response to the monitor command in a buffer in the controller without returning to the host memory; and/or (5) transmitting instructions to control a cooling unit to cool the device in response to determining that the sensed data satisfies the condition; and/or (6) wherein the host commands for the device are stored in command slots in a command list in the host memory, wherein the operations further comprise: in response to determining to send a monitor command to the device, selecting one of the command slots to use for the monitor command; and inserting the monitor command into the selected command slot, wherein the monitor command is retrieved when retrieving data for the selected command slot when processing the command list; and/or (7) setting a bit in a slot ownership register having a bit for each command slot to indicate the selected command slot is owned, wherein while the selected command slot is indicated as owned the host will ignore the command slot corresponding to the set bit; and/or (8) receiving a response to the host or monitor commands from the device; determining the command slot from which the host or monitor command was retrieved; determining whether the bit in the slot ownership register for the determined command slot indicates that the determined command slot is owned; returning the response to the command slot in the host memory in response to determining that the bit indicates that the determined command slot is not owned; and storing the returned sensed data in a controller buffer in response to determining that the command slot is owned; and/or (9) wherein the determining to send the monitor command comprises one of: determining that a timer has expired; and receiving a command from a controller component to send the monitor command; and/or (10) wherein there are a plurality of devices connected to the controller to receive Input/Output requests from the host, wherein the host memory includes host commands for the plurality of the devices that are retrieved and transmitted to the devices, and wherein the monitor command is transmitted to the devices while transmitting the retrieved host commands, wherein the adjusting the rate comprises: receiving sensed data from the devices in response to the monitor commands sent to the devices; determining a first group of at least one of the plurality of devices each having sensed data that satisfies the condition, wherein a second group of devices of the plurality of devices not in the first group each has sensed data that does not satisfy the condition; and adjusting the rate of processing of queued host commands for the devices in the first group, wherein the rate of processing of the queued host commands for the devices in the second group is not adjusted; and/or (11) wherein there are a plurality of devices connected to the controller to receive Input/Output requests from the host system, wherein host memory includes command lists, one for each of the devices, having the host commands for the devices, wherein the operations further comprise: periodically inserting the monitor command into the transmission of the retrieved host commands from the command lists to transmit to the devices while transmitting the host commands to the devices; and/or (12) receiving responses to the host commands from the devices; transmitting the responses to the host commands to the host memory; and storing the sensed data for the devices received in response to the monitor commands in a buffer in the controller without returning to the host memory.

In Example 22, the subject matter of Examples 20 and 21 can optionally include a machine readable medium including code, when executed, to cause a machine to perform the method of any one of claims 20-21.

Example 23 is a system, comprising: a host system including a host memory including command lists; a plurality of devices connected to receive Input/Output requests from the host system, wherein the devices each include at least one sensor to gather sensed data from the device, and wherein the host memory includes one command list for each of the devices; a controller in communication with the host system and the devices that when executed performs operations comprising: retrieving host commands from a host memory in the host to perform Input/Output operations with respect to the device; transmitting the retrieved host commands to the device to perform the I/O operations of the host command; periodically inserting a monitor command into the transmission of the retrieved host commands from the command lists to transmit to the devices while transmitting the host commands to the devices, wherein the monitor commands obtain the sensed data from the devices while processing the host commands; and adjusting a rate of transmitting the host commands in response to determining that the sensed data received from the device in response to the monitor command satisfies a condition.

In Example 24, the subject matter of Example 23 can optionally include that the operations further comprise: receiving responses to the host commands from the devices; transmitting the responses to the host commands to the host memory; and storing the sensed data for the devices received in response to the monitor commands in a buffer in the controller without returning to the host memory.

Example 25 is a system, comprising: a host system including a host memory including a command list; a device connected to receive Input/Output requests from the host system, wherein the device includes at least one sensor to gather sensed data from the device; a controller in communication with the host system and the device that when executed performs operations comprising: retrieving host commands from a host memory in the host to perform Input/Output operations with respect to the device; transmitting the retrieved host commands to the device to perform the I/O operations of the host command; transmitting a monitor command to obtain the sensed data from the device while processing the host commands; and adjusting a rate of transmitting the host commands in response to determining that the sensed data received from the device in response to the monitor command satisfies a condition.

In Example 26, the subject matter of claims 25 and 27-29 can optionally include that the sensed data comprises a temperature of the device, and wherein the sensed data satisfies the condition when the temperature exceeds a threshold temperature, and wherein the adjusting the rate comprises slowing the rate at which the retrieved host commands are transmitted to the device.

In Example 27, the subject matter of claims 25, 26 and 28-29 can optionally include that the operations further comprise: periodically inserting the monitor command into the transmission of the retrieved host commands to transmit to the device while transmitting the host commands to the device.

In Example 28, the subject matter of claims 25-27 and 29 can optionally include that the operations further comprise: receiving a response to the host commands from the device; transmitting the response to the host commands to the host memory; and storing the sensed data received in response to the monitor command in a buffer in the controller without returning to the host memory.

In Example 29, the subject matter of claims 25-28 can optionally include that the operations further comprise: transmitting instructions to control a cooling unit to cool the device in response to determining that the sensed data satisfies the condition.

Example 30 is an apparatus in communication with a host and a device, wherein the device includes at least one sensor to gather sensed data from the device, comprising: means for retrieving host commands from a host memory in the host to perform Input/Output operations with respect to the device; means for transmitting the retrieved host commands to the device to perform the I/O operations of the host command; means for transmitting a monitor command to obtain the sensed data from the device while processing the host commands; and means for adjusting a rate of transmitting the host commands in response to determining that the sensed data received from the device in response to the monitor command satisfies a condition.

In Example 31, the subject matter of claim 30 can optionally include means for periodically inserting the monitor command into the transmission of the retrieved host commands to transmit to the device while transmitting the host commands to the device.

Example 32 is an apparatus comprising means to perform a method as claimed in any preceding claim.

Example 33 is a machine-readable storage including machine-readable instructions, when executed, to implement a method or realize an apparatus or system as claimed in any preceding claim.

What is claimed:

1. A controller in communication with a host and a device, wherein the device includes at least one sensor to gather sensed data from the device, wherein the controller is to:
   retrieve host commands from a host memory in the host to perform Input/Output (I/O) operations with respect to the device;
   transmit retrieved host commands to the device to perform the I/O operations of the host command;
   periodically insert a monitor command into the transmission of the retrieved host commands to transmit to the device to obtain sensed data from the device while processing the host commands; and
   adjust a rate of transmitting further retrieved host commands from a command queue in the controller to the device in response to determining that the sensed data received from the device in response to the monitor command satisfies a condition.

2. The controller of claim 1, wherein the sensed data comprises a temperature of the device, and wherein the sensed data satisfies the condition when the temperature exceeds a threshold temperature, and wherein to adjust the rate comprises to slow the rate at which the retrieved host commands are transmitted to the device.

3. The controller of claim 2, wherein to slow the rate at which retrieved host commands are transmitted comprises:
   transmit the host commands to the device that are retrieved outside of a time window;
   queue commands that are retrieved within the time window; and
   transmit the queued commands when the time window ends.

4. The controller of claim 1, further to:
   receive a response to the host commands from the device;
   transmit the response to the host commands to the host memory; and
   store the sensed data received in response to the monitor command in a buffer in the controller without returning to the host memory.

5. The controller of claim 1, further to:
   transmit instructions to control a cooling unit to cool the device in response to determining that the sensed data satisfies the condition.

6. The controller of claim 1, wherein there are a plurality of devices connected to the controller to receive I/O requests from the host, wherein the host memory includes host commands for the plurality of the devices that are retrieved and transmitted to the devices, and wherein the monitor command is transmitted to the devices while transmitting the retrieved host commands, wherein to adjust the rate comprises:
   receive sensed data from the devices in response to monitor commands sent to the devices;
   determine a first group of at least one of the plurality of devices each having sensed data that satisfies the condition, wherein a second group of devices of the plurality of devices not in the first group each has sensed data that does not satisfy the condition; and adjust a rate of processing of queued host commands for the devices in the first group, wherein the rate of processing of the queued host commands for the devices in the second group is not adjusted.

7. The controller of claim 1, wherein there are a plurality of devices connected to the controller to receive Input/Output (I/O) requests from the host, wherein host memory includes command lists, one for each of the devices, having the host commands for the devices, wherein the periodically inserting the monitor command into the transmission of the retrieved host commands is from the command lists to transmit to the devices while transmitting the host commands to the devices.

8. The controller of claim 7, further to:
receive responses to the host commands from the devices;
transmit the responses to the host commands to the host memory; and
store the sensed data for the devices received in response to monitor commands in a buffer in the controller without returning to the host memory.

9. A controller in communication with a host and a device, wherein the device includes at least one sensor to gather sensed data from the device, wherein the controller is to:
retrieve host commands from a host memory in the host to perform Input/Output (I/O) operations with respect to the device, wherein the host commands for the device are stored in command slots in a command list in the host memory;
transmit the retrieved host commands to the device to perform the I/O operations of the host command;
in response to a determination to send a monitor command to the device, select one of the command slots to use for the monitor command;
insert the monitor command into the selected command slot, wherein the monitor command is retrieved when retrieving data for the selected command slot when processing the command list;
transmit the monitor command to obtain the sensed data from the device while processing the host commands; and
adjust a rate of transmitting the host commands in response to determining that the sensed data received from the device in response to the monitor command satisfies a condition.

10. The controller of claim 9, further to:
set a bit in a slot ownership register having a bit for each command slot to indicate the selected command slot is owned, wherein while the selected command slot is indicated as owned the host will ignore the command slot corresponding to the set bit.

11. The controller of claim 10, further to:
receive a response to the host or monitor commands from the device;
determine the command slot from which the host or monitor command was retrieved;
determine whether the bit in the slot ownership register for the determined command slot indicates that the determined command slot is owned;
return the response to the command slot in the host memory in response to determining that the bit indicates that the determined command slot is not owned; and
store the received sensed data in a controller buffer in response to determining that the command slot is owned.

12. The controller of claim 9, wherein to determine to send the monitor command comprises one of:
determine that a timer has expired; and
receive a command from a controller component to send the monitor command.

13. A computer readable storage medium including instructions to control a controller in communication with a host and a device, wherein the device includes at least one sensor to gather sensed data from the device, wherein the instructions when executed cause operations to:
retrieve host commands from a host memory in the host to perform Input/Output (I/O) operations with respect to the device;
transmit the retrieved host commands to the device to perform the I/O operations of the host command;
periodically insert a monitor command into the transmission of the retrieved host commands to transmit to the device to obtain sensed data from the device while processing the host commands; and
adjust a rate of transmitting further retrieved host commands from a command queue in the controller to the device in response to determining that the sensed data received from the device in response to the monitor command satisfies a condition.

14. The computer readable storage medium of claim 13, wherein the sensed data comprises a temperature of the device, and wherein the sensed data satisfies the condition when the temperature exceeds a threshold temperature, and wherein the adjusting the rate comprises slowing the rate at which the retrieved host commands are transmitted to the device.

15. The computer readable storage medium of claim 13, wherein the operations are further to:
receive a response to the host commands from the device;
transmit the response to the host commands to the host memory; and
store the sensed data received in response to the monitor command in a buffer in the controller without returning to the host memory.

16. The computer readable storage medium of claim 13, wherein the operations are further to:
transmit instructions to control a cooling unit to cool the device in response to determining that the sensed data satisfies the condition.

17. The computer readable storage medium of claim 13, wherein the host commands for the device are stored in command slots in a command list in the host memory, wherein the operations are further to:
in response to determining to send a monitor command to the device, select one of the command slots to use for the monitor command; and
insert the monitor command into the selected command slot, wherein the monitor command is retrieved when retrieving data for the selected command slot when processing the command list.

18. A method, comprising:
retrieving host commands from a host memory in a host to perform Input/Output (I/O) operations with respect to a device;
transmitting retrieved host commands to the device to perform the I/O operations of the host command;
periodically inserting a monitor command into the transmission of the retrieved host commands to transmit to the device to obtain sensed data from the device while processing the host commands; and
adjusting a rate of transmitting further retrieved host commands from a command queue to the device in response to determining that the sensed data received from the device in response to the monitor command satisfies a condition.

19. The method of claim 18, further comprising:

receiving a response to the host commands from the device;

transmitting the response to the host commands to the host memory; and storing the sensed data received in response to the monitor command in a buffer without returning to the host memory.

20. The method of claim 18, further comprising:

transmitting instructions to control a cooling unit to cool the device in response to determining that the sensed data satisfies the condition.

21. A system, comprising:

a host system including a host memory including command lists;

a plurality of devices connected to receive Input/Output (I/O) requests from the host system, wherein the devices each include at least one sensor to gather sensed data from the device, and wherein the host memory includes one command list for each of the devices;

a controller in communication with the host system and the devices that when executed performs operations to:

retrieve host commands from a host memory in the host to perform Input/Output (I/O) operations with respect to the devices;

transmit the retrieved host commands to the devices to perform the I/O operations of the host command;

periodically insert a monitor command into the transmission of the retrieved host commands from the command lists to transmit to the devices while transmitting the host commands to the devices, wherein the monitor commands obtain the sensed data from the devices while processing the host commands; and adjust a rate of transmitting the host commands in response to determining that the sensed data received from the devices in response to the monitor command satisfies a condition.

22. The system of claim 21, wherein the operations are further to:

receive responses to the host commands from the devices;

transmit the responses to the host commands to the host memory; and store the sensed data for the devices received in response to monitor commands in a buffer in the controller without returning to the host memory.

* * * * *